(12) United States Patent
Wang et al.

(10) Patent No.: US 12,481,095 B2
(45) Date of Patent: Nov. 25, 2025

(54) NEAR-EYE DISPLAY APPARATUS

(71) Applicants: Beijing BOE Optoelectronics Technology Co., Ltd., Beijing (CN); BOE Technology Group Co., Ltd., Beijing (CN)

(72) Inventors: Chenru Wang, Beijing (CN); Na Han, Beijing (CN); Ruijun Dong, Beijing (CN); Ke Li, Beijing (CN); Yulong Wu, Beijing (CN); Jiarong Bai, Beijing (CN); Lili Chen, Beijing (CN); Hao Zhang, Beijing (CN)

(73) Assignees: Beijing BOE Optoelectronics Technology Co., Ltd., Beijing (CN); Beijing BOE Technology Development Co., Ltd., Beijing (CN)

(*) Notice: Subject to any disclaimer, the term of this patent is extended or adjusted under 35 U.S.C. 154(b) by 503 days.

(21) Appl. No.: 17/921,309

(22) PCT Filed: Oct. 11, 2021

(86) PCT No.: PCT/CN2021/123097
§ 371 (c)(1),
(2) Date: Oct. 25, 2022

(87) PCT Pub. No.: WO2022/095663
PCT Pub. Date: May 12, 2022

(65) Prior Publication Data
US 2023/0168423 A1  Jun. 1, 2023

(30) Foreign Application Priority Data
Nov. 9, 2020  (CN) .......................... 202011237845.4

(51) Int. Cl.
*F21V 8/00* (2006.01)
*G02B 27/01* (2006.01)
*G02B 27/10* (2006.01)

(52) U.S. Cl.
CPC .......... *G02B 6/003* (2013.01); *G02B 27/0172* (2013.01); *G02B 27/10* (2013.01)

(58) Field of Classification Search
CPC .... G02B 6/003; G02B 27/0172; G02B 27/10; G02B 2027/0123; G02B 2027/0134; G02B 2027/0178; G02B 27/0101
See application file for complete search history.

(56) References Cited

U.S. PATENT DOCUMENTS 10,534,185 B1   1/2020  Lee et al.
2010/0271587 A1  10/2010  Pavlopoulos
(Continued)

FOREIGN PATENT DOCUMENTS

CN   101796450 A   8/2010
CN   103837988 A   6/2014
(Continued)

OTHER PUBLICATIONS

CN202011237845.4 first office action.
(Continued)

*Primary Examiner* — Collin X Beatty
(74) *Attorney, Agent, or Firm* — IPro, PLLC (57) ABSTRACT

Provided is a near-eye display apparatus, comprising: a first display (11), used for displaying a first image, entering a beam splitter (30) by means of a first imaging lens (12); a second display (21), used for displaying a second image, entering the beam splitter (30) by means of a second imaging lens (22), the beam splitter (30) being used for transmitting the imaging light beam of the first imaging lens (12) and reflecting the imaging light beam of the second imaging lens
(Continued)

(22); a waveguide plate (40), located on the light exit path of the beam splitter (30), and used for receiving outgoing light from the beam splitter (30) and transmitting same; the waveguide plate (40) is internally provided with a light-taking component (400), the light-taking component (400) being used for reflecting the imaging light beam transmitted in the waveguide plate (40) toward a position where a human eye is located. The image distances of the first imaging lens (12) and the second imaging lens (22) are different, thus it is possible to display the first image and the second image on two image planes, and, by means of adjusting the human eye, when observing an image of an image plane the image of the other image plane is blurry, which is consistent with a sensation of viewing an actual scene, thus eliminating vergence-accommodation conflict.

14 Claims, 4 Drawing Sheets

(56) References Cited

U.S. PATENT DOCUMENTS

| | | |
|---|---|---|
| 2017/0045744 A1 | 2/2017 | Amitai |
| 2019/0285883 A1 | 9/2019 | Cui |
| 2020/0257034 A1 | 8/2020 | Masuda |
| 2021/0255460 A1 | 8/2021 | Li et al. |
| 2022/0308368 A1 | 9/2022 | Wang et al. |

FOREIGN PATENT DOCUMENTS

| | | |
|---|---|---|
| CN | 104049368 A | 9/2014 |
| CN | 104570353 A | 4/2015 |
| CN | 105629474 A | 6/2016 |
| CN | 106461946 A | 2/2017 |
| CN | 107272204 A | 10/2017 |
| CN | 107422484 A | 12/2017 |
| CN | 107450188 A | 12/2017 |
| CN | 108369346 A | 8/2018 |
| CN | 108508523 A | 9/2018 |
| CN | 108803020 A | 11/2018 |
| CN | 108803021 A | 11/2018 |
| CN | 108873355 A | 11/2018 |
| CN | 208188482 U | 12/2018 |
| CN | 109683317 A | 4/2019 |
| CN | 110031978 A | 7/2019 |
| CN | 110187507 A | 8/2019 |
| CN | 110192142 A | 8/2019 |
| CN | 110927969 A | 3/2020 |
| CN | 111025661 A | 4/2020 |
| CN | 111175976 A | 5/2020 |
| CN | 211698430 U | 10/2020 |
| WO | 2020021160 A1 | 1/2020 |

OTHER PUBLICATIONS

CN202011237845.4 second office action.
CN202011237845.4 third office action.
CN202011237845.4 fourth office action.

NEAR-EYE DISPLAY APPARATUS

CROSS REFERENCE TO RELATED APPLICATIONS

The present application is a US National Stage of International Application No. PCT/CN2021/123097, filed on Oct. 11, 2021, which claims priority to the Chinese Patent Application No. 202011237845.4, filed to the China Patent Office on Nov. 9, 2020 and entitled "NEAR-EYE DISPLAY APPARATUS", the entire contents of which are incorporated herein by reference.

FIELD

The present disclosure relates to the technical field of display, in particular to a near-eye display apparatus.

BACKGROUND

Near-eye display is a current hot topic of study, such as virtual reality display in a form of a helmet and augmented reality display in a form of smart glasses. Near-eye display can make people have an unprecedented sense of interaction and has a significant application value in numerous fields such as telemedicine, industrial design, education, virtual military training and entertainment.

A virtual reality (VR) technology presents a fully-enclosed virtual environment, an augmented reality (AR) technology is an augmented projection mode of overlaying a virtual scene into a real environment, and the two popular display modes have already made them into the public eye and started to be widely applied.

As for a VR/AR display apparatus used at present, a focal length of a displayed image is fixed, people's eyes focus on the same image plane for a long time when viewing the displayed image, which has a conflict with accommodation for an optic nerve by the brain, the people's eyes may have fatigue and dizziness when continuously viewing the displayed image for too long time, and then a vergence-accommodation conflict is caused.

SUMMARY

The present disclosure provides a near-eye display apparatus, including: a first display, configured to display a first image; a second display, configured to display a second image; a first imaging lens, located on a light emitting side of the first display and configured to perform imaging on the first image; and a second imaging lens, located on a light emitting side of the second display and configured to perform imaging on the second image, wherein an image distance of the first imaging lens is different from an image distance of the second imaging lens; a beam splitter, located on a side of the first imaging lens facing away from the first display and on a side of the second imaging lens facing away from the second display, and configured to transmit an imaging light beam of the first imaging lens and reflecting an imaging light beam of the second imaging lens; and a waveguide plate, located on a light emitting path of the beam splitter and configured to receive an outgoing light beam from the beam splitter and transmit the outgoing light beam, wherein a light extraction component is arranged in the waveguide plate and configured to reflect the imaging light beams transmitted in the waveguide plate toward a position where a human eye is located.

In some embodiments of the present disclosure, a distance between the first imaging lens and the first display and a distance between the second imaging lens and the second display are the same, and a focal length of the first imaging lens is different from a focal length of the second imaging lens; or a focal length of the first imaging lens and a focal length of the second imaging lens are the same, and a distance between the first imaging lens and the first display and a distance between the second imaging lens and the second display are different.

In some embodiments of the present disclosure, the distance between the first imaging lens and the first display is smaller than the focal length of the first imaging lens, and the distance between the second imaging lens and the second display is smaller than the focal length of the second imaging lens.

In some embodiments of the present disclosure, the waveguide plate includes: a light entering surface, a light emitting surface and a back surface, the light emitting surface is opposite to the back surface, the light entering surface is located at the same end of the light emitting surface and the back surface and connected with the light emitting surface and the back surface, and the light entering surface is inclined relative to the light emitting surface.

In some embodiments of the present disclosure, the light extraction component includes a transflective layer, the transflective layer is located between the light emitting surface and the back surface, a set included angle is formed by the transflective layer and the light emitting surface, and the transflective layer is configured to partially transmit part of an imaging light beam and partially reflect an imaging light beam toward the light emitting surface.

In some embodiments of the present disclosure, the light extraction component includes a plurality of transflective layers, and the respective transflective layers are distributed in parallel and at equal intervals and are inclined relative to the light emitting surface.

In some embodiments of the present disclosure, an included angle between the light entering surface and the light emitting surface is twice the included angle between the transflective layer and the light emitting surface.

In some embodiments of the present disclosure, a quantity of transflective layers is 2 to 6.

In some embodiments of the present disclosure, a reflectivity of the transflective layer is increased with increasing of a distance between the transflective layer and the light entering surface.

In some embodiments of the present disclosure, a material of the waveguide plate is glass or plastic.

In some embodiments of the present disclosure, the beam splitter includes: a first prism and a second prism which are the same in structure; the first prism and the second prism each include a slope, and the slope of the first prism overlaps with the slope of the second prism so that the first prism and the second prism constitute a cuboid structure; a beam splitting layer is arranged on an overlapping surface of the first prism and the second prism; the second prism is arranged close to the light entering surface of the waveguide plate, and the first prism is located on a side of the second prism facing away from the waveguide plate; the first prism is arranged close to the first imaging lens, and the second prism is arranged facing the second imaging lens; and a surface of the second prism facing the light entering surface of the waveguide plate is a light emitting surface of the beam splitter, and a surface of the first prism facing the first imaging lens is a light entering surface of the first prism, and a surface of the second prism facing the second imaging lens is a light entering surface of the second prism.

In some embodiments of the present disclosure, the beam splitting layer is a semi-transmitting and semi-reflecting layer or a polarizing beamsplitting dielectric layer.

In some embodiments of the present disclosure, a surface of the first imaging lens close to the first prism is in contact with the light entering surface of the first prism through a vertex of an optical axis; and a surface of the second imaging lens close to the second prism is in contact with the light entering surface of the second prism through a vertex of an optical axis.

In some embodiments of the present disclosure, the light emitting surface of the beam splitter is attached to the light entering surface of the waveguide plate.

In some embodiments of the present disclosure, the first imaging lens includes at least one lens; and the second imaging lens includes at least one lens.

In some embodiments of the present disclosure, the lens in the first imaging lens adopts one of a spherical lens, an aspheric lens or a freeform lens; and the lens in the second imaging lens adopts one of a spherical lens, an aspheric lens or a freeform lens.

In some embodiments of the present disclosure, a material of the lens in the first imaging lens adopts glass or plastic; and a material of the lens in the second imaging lens adopts glass or plastic.

In some embodiments of the present disclosure, the first display and the second display adopt one of a liquid crystal display, an organic light emitting diode display, a micro-organic light emitting diode display, a liquid crystal on silicon display, a light emitting diode display, a micro-light emitting diode display or a digital light processing display.

BRIEF DESCRIPTION OF THE DRAWINGS

In order to describe technical solutions of embodiments of the present disclosure more clearly, accompanying drawings needing to be used in the embodiments of the present disclosure will be introduced briefly below. Apparently, the accompanying drawings introduced below are merely some embodiments of the present disclosure. Those ordinarily skilled in the art can also obtain other accompanying drawings according to these accompanying drawings without creative work.

DETAILED DESCRIPTION OF THE EMBODIMENTS

In order to make the above objectives, features and advantages of the present disclosure clearer and easier to understand, the present disclosure will be further described below with reference to the accompanying drawings and the embodiments. However, exemplary implementations can be implemented in various forms and should not be understood as being limited to the implementations described herein, rather, these implementations are provided to make the present disclosure completer and more comprehensive, and a concept of the exemplary implementations are comprehensively delivered to those skilled in the art. The same reference numerals in the drawings represent the same or similar structures, so their repetitions will be omitted. Words denoting positions and directions described in the present disclosure are described by taking the accompanying drawings as examples, but changes may also be made according to demands, and all the changes fall within the protection scope of the present disclosure. The accompanying drawings of the present disclosure are merely used for illustrating a relative position relation rather than represent a true scale.

The near-eye display apparatus refers to a display device worn on eyes of a user, for example, the near-eye display apparatus is usually presented in a form of glasses or a helmet. The near-eye display apparatus may provide AR and VR experiences for the user. An AR near-eye display technology is to overlay a virtual image generated by the near-eye display apparatus with a real scene image of a real world for display, so that the user can view a final augmented real scene image from a screen. A VR near-eye display technology is to respectively display a left eye image and a right eye image on near-eye displays corresponding to a left eye and a right eye, the left eye and the right eye obtain image information with a difference respectively, and then a stereoscopic vision may be synthesized in a brain.

Usually, there is merely one position of an image plane generated by the near-eye display apparatus, but as for fusion of stereoscopic display, the brain may deliver, to a human optic nerve, a signal of focusing of a plurality of image distances based on a stereoscopic image. A brain adjustment signal received by the human optic nerve has a conflict with the only image plane position actually focused and aligned by human eyes, and consequently, the human eyes may have eye fatigue and dizziness in a process of continuously viewing a dynamic 3D image, that is, a vergence-accommodation conflict.

In order to solve the above problems, an embodiment of the present disclosure provides a near-eye display apparatus. The near-eye display apparatus provided by the embodiment of the present disclosure is more in line with a situation of viewing a real scene with the human eyes and can solve the problem of the vergence-accommodation conflict.

Figure 1:
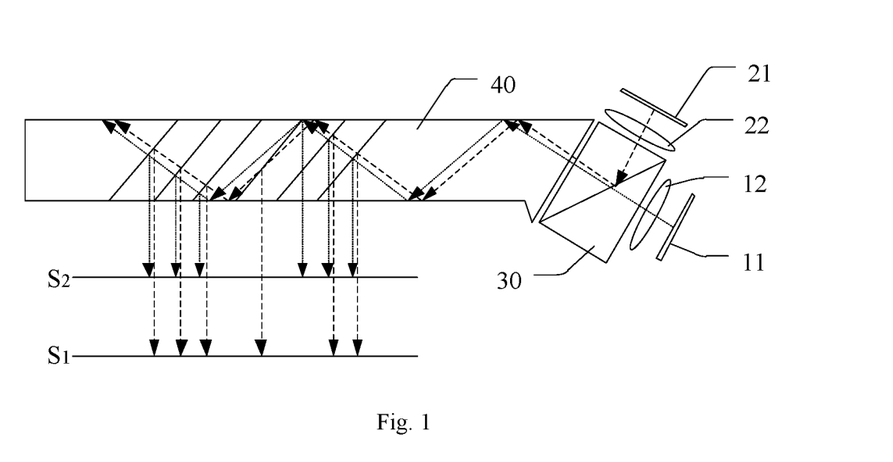
FIG. 1 is a first schematic structural diagram of a near-eye display apparatus provided by an embodiment of the present disclosure.
Figure 2:
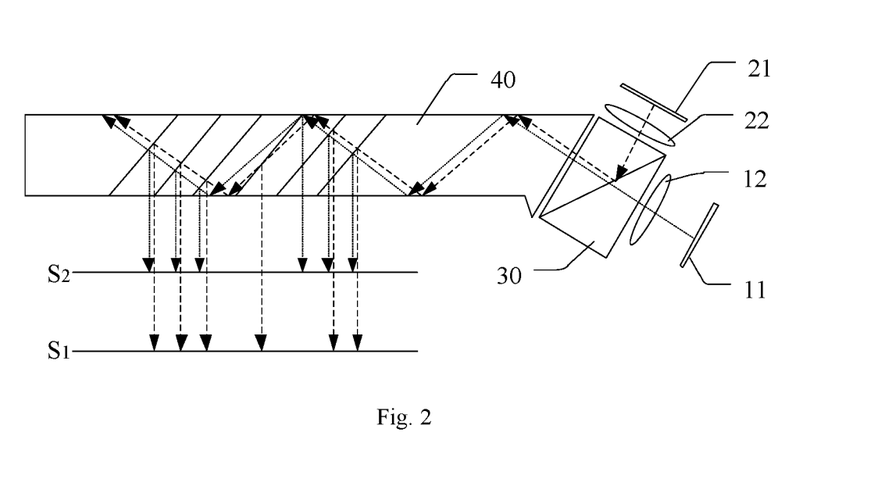
FIG. 2 is a second schematic structural diagram of a near-eye display apparatus provided by an embodiment of the present disclosure.

FIG. 1 and FIG. 2 are schematic structural diagrams of a near-eye display apparatus provided by an embodiment of the present disclosure.

Referring to FIG. 1 and FIG. 2, the near-eye display apparatus provided by the embodiment of the present disclosure includes: a first display 11, a second display 21, a first imaging lens 12, a second imaging lens 22, a beam splitter 30 and a waveguide plate 40.

The first display 11 is configured to display a first image, and the second display 21 is configured to display a second image. The first imaging lens 12 is located on a light emitting side of the first display 11 and configured to perform imaging on the first image displayed by the first display 11, and the second imaging lens 22 is located on a light emitting side of the second display 21 and configured to perform imaging on the second image displayed by the second display 21. The first display 11 and the first imaging lens 12 constitute a first channel, and the second display 21 and the second imaging lens 22 constitute a second channel.

The beam splitter 30 is located on a light emitting side of the first channel and located on a light emitting side of the second channel. The beam splitter 30 is configured to transmit an imaging light beam of the first channel and reflect an imaging light beam of the second channel. Two surfaces of the beam splitter 30 facing the first channel and the second channel are light entering surfaces, and the beam splitter 30 can enable the imaging light beams of the two channels to converge toward the waveguide plate 40.

The waveguide plate 40 is located on a light emitting path of the beam splitter 30 and configured to receive an outgoing light beam of the beam splitter 30 and deliver the outgoing light beam. A light extraction component 400 is arranged in the waveguide plate 40 and configured to reflect the imaging light beam delivered in the waveguide plate 40 toward a position where a human eye is located (not shown).

An image distance of the first imaging lens 12 is different from an image distance of the second imaging lens 22, so it can be guaranteed that an image of the first channel and an image of the second channel are imaged on two different image planes, distances between the two image planes and the human eye are different, by means of adjustment of the human eye, when viewing the image of one image plane, the image of the other image plane is blurry, which is consistent with a sensation of viewing a real scene with the human eye, and thus a problem of dizziness caused by brain fatigue after long-time viewing can be eliminated.

The first image and the second image may be the same image, or different images. For example, one of the first image or the second image is a foreground image, the other one is a background image. The above near-eye display apparatus provided by the embodiment of the present disclosure may finally focus the first image and the second image on different image planes, so that a certain depth of field is caused between the foreground image and the background image, which is more in line with the situation of viewing the real scene with the human eye.

The first display 11 and the second display 21 adopt one of a liquid crystal display, an organic light emitting diode display, a micro-organic light emitting diode display, a liquid crystal on silicon display, a light emitting diode display, a micro-light emitting diode display or a digital light processing display, which is not limited herein.

The liquid crystal display (LCD) includes a backlight module and a liquid crystal display panel. The liquid crystal display panel does not emit light per se and needs to rely on a light source provided by the backlight module so as to realize brightness display. An imaging principle of the LCD is to put liquid crystals between two pieces of conductive glass, driven by an electric field between two electrodes and causing an electric field effect of liquid crystal molecular distortion so as to control backlight source transmitting or blocking functions, and thus an image is displayed. If a color filter is added, a color image can be displayed. A liquid crystal display technology is mature, and a liquid crystal display screen has a lower cost and excellent performance.

An organic light emitting diode (OLED) display is also called an organic electroluminesence display or an organic light emitting semiconductor display. The OLED display belongs to a current-type organic light emitting device, which is a phenomenon of electroluminescence through injection and combination of current carriers, and a light-emitting intensity is in direct proportion to an injected current. As for the OLED under the action of the electric field, a hole generated by an anode and an electron generated by a cathode may move and be respectively injected into a hole transport layer and an electron transport layer to migrate to a light-emitting layer. When the hole and the electron meet on the light-emitting layer, energy excitons are generated, so that light-emitting molecules are excited to finally generate visible light. The OLED display is a self-luminous display, so it does not need to be provided with a backlight module, a whole thickness of the display is small, and thus it is beneficial to miniaturization of the near-eye display apparatus and more beneficial to complete installation.

The micro-organic light emitting diode (Micro-OLED) display is to miniaturize a light-emitting unit of an organic light-emitting diode, so that more pixels may be arranged in a limited size, and a definition of a display screen is improved.

A light emitting diode (LED) display is a display screen by adopting an LED array, LEDs are used as display sub-pixels, and image displaying can be realized by controlling a display brightness of each LED. The LED display has characteristics of being high in brightness, low in power consumption, low in voltage demand, small, portable and the like. The LED display is used as a display screen in the near-eye display apparatus, which is beneficial to realizing miniaturization of the near-eye display apparatus.

The micro-light emitting diode (Micro-LED) display uses an LED chip as a light-emitting unit, compared with a traditional LED, the Micro-LED has a smaller size, so more pixels may be arranged in a limited display region, and an image definition is improved.

The liquid crystal on silicon (LCOS) display is formed by using a complementary metal oxide semiconductor (CMOS) coated with liquid crystal silicon as a substrate, being combined with a reflecting layer to form a CMOS base plate, then attaching the CMOS base plate to a base plate having an electrode, and then injecting liquid crystals. The LCOS display serves as a reflective display apparatus and has advantages of being large in aperture opening ratio, high in definition, high in response speed, small in size, low in weight and the like, so high-definition display can be realized.

The digital light processing (DLP) display is a projection system based on a digital micro-mirror device (DMD). Rotation of the DMD device is controlled by a digital drive signal. A lens rotates when a micro-mirror in the DMD receives a corresponding signal so as to reflect a light beam. The lens may be switched on and off more than 1000 times within a second by performing addressing on a storage unit under each lens of the DMD in a binary plane signal. An image projected by the DLP system is bright and beautiful in color, natural, lifelike, and suitable for high-definition display.

In the embodiment of the present disclosure, a distance from the first display 11 to the first imaging lens 12 is smaller than a focal length of the first imaging lens 12, a distance from the second display 21 to the second imaging lens 22 is smaller than a focal length of the second imaging lens 22, and thus an erect and magnified virtual image can be obtained when an object distance is within the focal length.

The embodiment of the present disclosure may realize an effect of different image distances of the first imaging lens 12 and the second imaging lens 22 in two modes.

In an applicable mode, as shown in FIG. 1, the distance between the first imaging lens 12 and the first display 11 and the distance between the second imaging lens 22 and the second display 21 are the same, and the focal length of the first imaging lens 12 is different from the focal length of the second imaging lens 22.

The distance between the first imaging lens 12 and the first display 11 reflects an object distance of the first imaging lens 12, and the distance between the second imaging lens 22 and the second display 21 reflects an object distance of the second imaging lens 22. when the object distance of the first imaging lens 12 is equal to the object distance of the second imaging lens 22, the image distance is relevant to the focal length, the larger the focal length is, the larger the image distance is, so two images can be imaged at different image distances by adjustment to make the focal lengths of the first imaging lens 12 and the second imaging lens 22 different.

Taking the near-eye display apparatus shown in FIG. 1 as an example, the distance from the first display 11 to the first imaging lens 12 is equal to the distance from the second display 21 to the second imaging lens 22, the focal length of the first imaging lens 12 is greater than the focal length of the second imaging lens 22, thus imaging of the first image can be at a farther position than imaging of the second image, so a first image plane $S_1$ of the first imaging lens 12 is farther from the human eye and configured to display the background image, and a second image plane $S_2$ of the second imaging lens 22 is closer to the human eye and configured to display the foreground image.

In another applicable mode, as shown in FIG. 2, the focal length of the first imaging lens 12 and the focal length of the second imaging lens 22 are the same, and the distance between the first imaging lens 12 and the first display 11 is different from the distance between the second imaging lens 22 and the second display 21.

The distance between the first imaging lens 12 and the first display 11 reflects the object distance of the first imaging lens 12, and the distance between the second imaging lens 22 and the second display 21 reflects the object distance of the second imaging lens 22. When the focal length of the first imaging lens 12 and the focal length of the second imaging lens 22 are equal, the image distance is relevant to the object distance, the larger the object distance is, the larger the image distance is, and the smaller the object distance is, the smaller the image distance is, so that two images can be imaged at different image distances by adjusting the object distances of the first imaging lens 12 and the second imaging lens 22.

Taking the near-eye display apparatus shown in FIG. 2 as an example, the focal length of the first imaging lens 12 and the focal length of the second imaging lens 22 are equal, the distance from the first display 11 to the first imaging lens 12 is greater than the distance from the second display 21 to the second imaging lens 22, that is, the object distance of the first imaging lens 12 is greater than the object distance of the second imaging lens 22, and thus the image distance of the first imaging lens 12 may be greater than the image distance of the second imaging lens 22, so the first image plane $S_1$ of the first imaging lens 12 is farther from the human eye and configured to display the background image, and the second image plane $S_2$ of the second imaging lens 22 is closer to the human eye and configured to display the foreground image.

In the embodiment of the present disclosure, the first imaging lens 12 includes at least one lens, and the second imaging lens 22 includes at least one lens.

Figure 3:
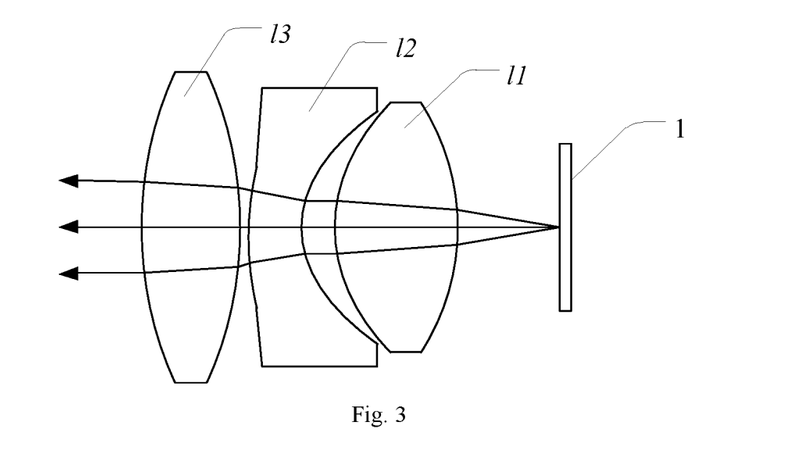
FIG. 3 is a schematic structural diagram of an imaging lens provided by an embodiment of the present disclosure.

FIG. 3 is a schematic structural diagram of an imaging lens provided by an embodiment of the present disclosure.

Taking a structure of the imaging lens shown in FIG. 3 as an example, the first imaging lens 12 and the second imaging lens 22 in the embodiment of the present disclosure may both adopt the structure of the imaging lens. As shown in FIG. 3, the imaging lens includes a first lens 11, a second lens 12 and a third lens 13. The first lens 11 is located on a side close to a display 1, the second lens 12 and the third lens 13 are located on a side far away from the display 1, and the second lens 12 is located between the first lens 11 and the third lens 13. It can be seen from FIG. 3 that both the first lens 11 and the third lens 13 may adopt a convex lens, and the second lens 12 may adopt a concave lens.

Besides, the imaging lens may also include merely one lens to simplify the structure, or may also include two or more lenses, which is selected according to actual demands and is not limited herein. When the imaging lens includes a plurality of lenses, a lens cone may be adopted to fix them. Each lens in the imaging lens may be of a central symmetry structure, an optical axis is located in a central position of the lens, and optical axes of all the lenses are parallel.

The lens in the first imaging lens 12 adopts one of a spherical lens, an aspheric lens or a freeform lens, and the lens in the second imaging lens 22 adopts one of a spherical lens, an aspheric lens or a freeform lens. The spherical lens has advantages of being simple in design, low in assembling accuracy requirement and the like. A thickness of the aspheric lens and a thickness of the freeform lens are relatively small, and image quality can be optimized, which can be selected according to actual demands during optical design.

A material of the lens in the first imaging lens 12 adopts glass or plastic, and a material of the lens in the second imaging lens 22 adopts glass or plastic, which is not limited herein.

The beam splitter 30 is located on a side of the first imaging lens 12 facing away from the first display 11 and on a side of the second imaging lens 22 facing away from the second display 21 and configured to transmit the imaging light beam of the first imaging lens and reflect the imaging light beam of the second imaging lens.

A core component in the beam splitter 30 is a beam splitting layer, and when a light beam enters the beam splitting layer, part of the light beam is transmitted, and the other part of the light beam is reflected. In this way, when the imaging light beams of the first imaging lens 12 and the second imaging lens 22 enter the beam splitting layer from two sides of the beam splitting layer respectively, the transmitted light beam of the first imaging lens 12 and the reflected light beam of the second imaging lens 22 may enter the waveguide plate in the same direction, and thus merging of the light beams is realized.

Figure 4:
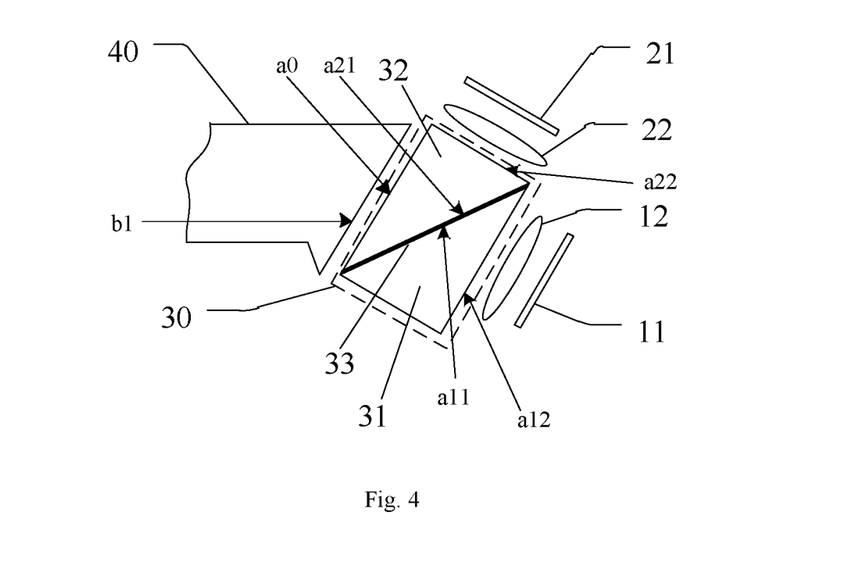
FIG. 4 is a first schematic structural diagram of a beam splitter provided by an embodiment of the present disclosure.

FIG. 4 is a first schematic structural diagram of a beam splitter provided by an embodiment of the present disclosure.

Referring to FIG. 4, the beam splitter 30 includes: a first prism 31 and a second prism 32 which are the same in structure, the first prism 31 and the second prism 32 each include a slope, the slope of the first prism 31 is a11, and the slope of the second prism 32 is a21. The slopes (i.e., a11 and a21) of the first prism 31 and the second prism 32 overlap with each other, so that the first prism 31 and the second prism 32 constitute a cuboid structure. A beam splitting layer 33 is arranged on overlapping surfaces of the first prism 31 and the second prism 32. The beam splitting layer 33 may be firstly attached to the slope (a11 or a21) of any one of the first prism 31 or the second prism 32, and then the first prism 31 and the second prism 32 overlap.

As shown in FIG. 4, the second prism 32 is arranged close to the light entering surface b1 of the waveguide plate 40, and the first prism 31 is located on a side of the second prism 32 facing away from the waveguide plate 40; the first prism 31 is arranged close to the first imaging lens 12, and the second prism 32 is arranged facing the second imaging lens 22; and a surface of the second prism 32 facing the light entering surface b1 of the waveguide plate 40 is a light emitting surface a0 of the beam splitter 30, a surface of the first prism 31 facing the first imaging lens 12 is a light entering surface a12 of the first prism 31, and a surface of the second prism 32 facing the second imaging lens 22 is a light entering surface a22 of the second prism 32.

Both the first prism 31 and the second prism 32 are right-angle prisms. Before the first prism 31 and the second prism 32 overlap, each right-angle prism has six surfaces. After the slope a11 of the first prism 31 overlaps with the slope a21 of the second prism 32, the first prism 31 and the second prism 32 constitute a cuboid or a cube. The second prism 32 is arranged close to the waveguide plate 40, the surface of the second prism 32 facing the waveguide plate 40 is the light emitting surface a0 of the beam splitter 30, the surface adjacent to the light emitting surface a0 is the light entering surface a22 for receiving the imaging light beam of the second imaging lens 22. The light entering surface of the first prism 31 is adjacent and perpendicular to the light entering surface a22 of the second prism 32, and the surface of the first prism 31 facing the first imaging lens 12 is the light entering surface a12 of the first prism 31. In this way, the imaging light beams of the first imaging lens 12 and the second imaging lens 22 may enter the beam splitter 30 respectively from two mutually perpendicular surfaces of the beam splitter 30. A structure of the first prism 31 is completely identical with a structure of the second prism 32, so it can be guaranteed that an optical path, in the beam splitter, of the imaging light beam of the first imaging lens 12 shining from the first prism 31 is equal to an optical path, in the beam splitter, of the imaging light beam of the second imaging lens 22 shining from the second prism 32, the beam splitter does not affect final imaging positions of the light beams of the two channels, and the influence on two image plane positions only depends on a relation of the object distances and the focal lengths of the first imaging lens 12 and the second imaging lens 22.

Besides, the beam splitter 30 may also be arranged in a structure of only including the beam splitting layer, at the moment, the beam splitter needs to be fixed through a support so as to keep a relative position relation between the beam splitter 30 and the first imaging lens 12, the second imaging lens 22 and the waveguide plate.

Figure 5:
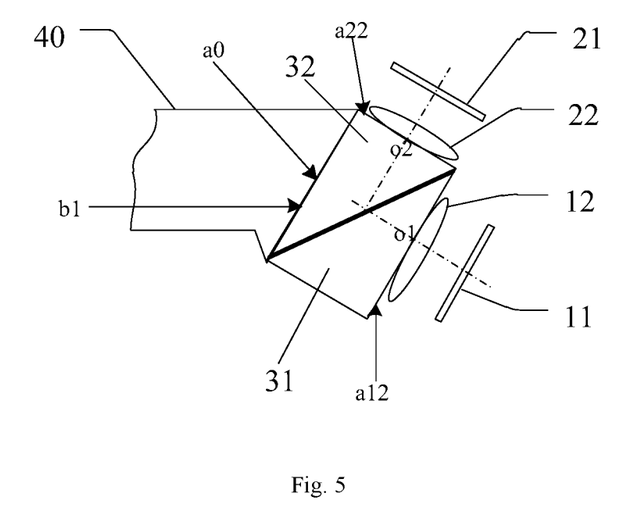
FIG. 5 is a second schematic structural diagram of a beam splitter provided by an embodiment of the present disclosure.

FIG. 5 is a second schematic structural diagram of a beam splitter provided by an embodiment of the present disclosure.

Referring to FIG. 5, a surface of the first imaging lens 12 close to the first prism 31 is in contact with the light entering surface a12 of the first prism 31 through a vertex o1 of an optical axis, and a surface of the second imaging lens 22 close to the second prism 32 is in contact with the light entering surface a22 of the second prism 32 through a vertex o2 of an optical axis.

Each lens in the first imaging lens 12 and the second imaging lens 22 adopts a central symmetry structure, and a center point of the lens passes through an optical axis. A center point of a surface of a lens of the first imaging lens 12 closest to the first prism 31 is a vertex o1, and the vertex o1 of the lens is in contact with the light entering surface a12 of the first prism 31. A center point of a surface of a lens of the second imaging lens 22 closest to the second prism 32 is a vertex o2, and the vertex o2 of the lens is in contact with the light entering surface a22 of the second prism 32. In this way, it is more beneficial to assembling of the beam splitter 30, the first imaging lens 12 and the second imaging lens 22.

Similarly, as shown in FIG. 5, the light emitting surface a0 of the beam splitter 30 is attached to the light entering surface b1 of the waveguide plate 40. The beam splitter 30 is attached to the waveguide plate 40, so that a step of light beam alignment during assembling can be omitted, and an assembling flow is simplified.

In the embodiment of the present disclosure, the beam splitting layer 33 may adopt a semi-transmitting and semi-reflecting layer or a polarizing beamsplitting dielectric layer.

The semi-transmitting and semi-reflecting layer is used as the beam splitting layer 33, so there is no requirement for a polarization state of an entering light beam, and thus there is no requirement for types of the first display 11 and the second display 21. A ratio of a reflectivity to a transmissivity of the semi-transmitting and semi-reflecting layer may be set to be 1:1, so a proportion of a light beam of the first display 11 transmitted by the semi-transmitting and semi-reflecting layer after passing through the first imaging lens 12 is basically equal to a proportion of a light beam of the second display 21 reflected by the semi-transmitting and semi-reflecting layer after passing through the second imaging lens 22.

When the polarizing beamsplitting dielectric layer is used as the beam splitting layer 33, the polarizing beamsplitting dielectric layer may transmit light p and reflect light s, so a polarizer may be arranged on a light emitting side of the first display 11 so as to make the outgoing light beam of the first display 11 light p, in the meantime, a polarizer is arranged on a light emitting side of the second display 21 so as to make the outgoing light beam of the second display 21 light s, in this way, the polarizing beamsplitting dielectric layer may completely transmit the outgoing light beam of the first display 11 and completely reflect the outgoing light beam of the second display 21, and a utilization efficiency of the light beams is improved.

As shown in FIG. 1 and FIG. 2, the waveguide plate 40 is located on a light emitting path of the beam splitter 30 and configured to receive the outgoing light beam from the beam splitter 30 and deliver the outgoing light beam. The light extraction component 400 is arranged in the waveguide plate 40 and may reflect the imaging light beam delivered in the waveguide plate 40 toward a position where the human eye is located (not shown).

Figure 6:
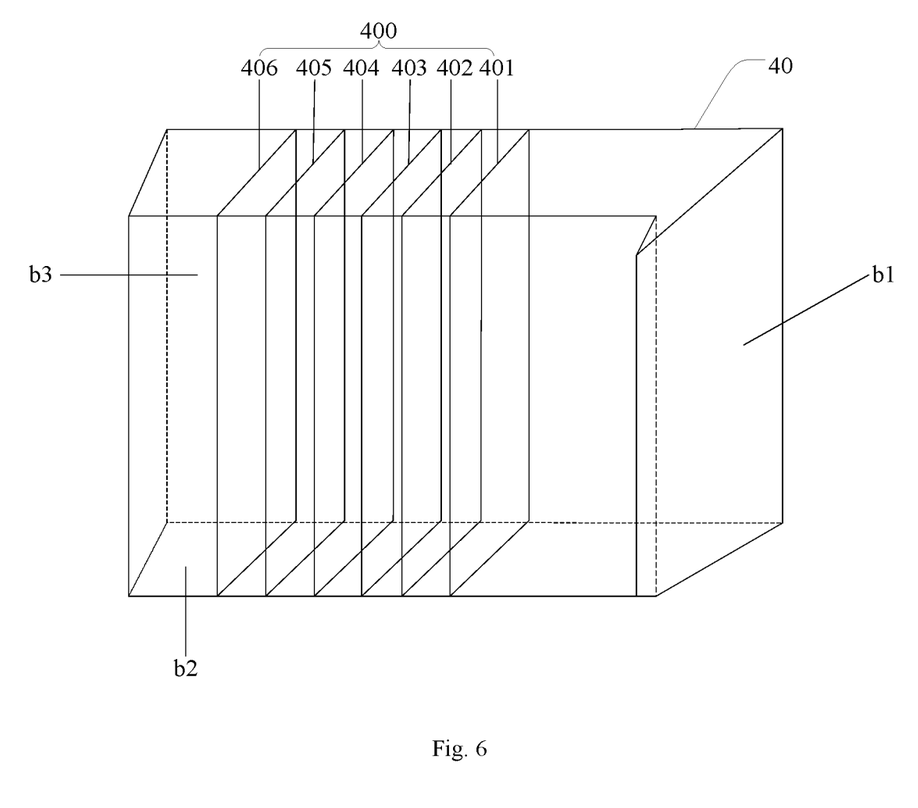
FIG. 6 is a schematic structural solid diagram of a waveguide plate provided by an embodiment of the present disclosure.

FIG. 6 is a schematic structural solid diagram of a waveguide plate provided by an embodiment of the present disclosure.

Referring to FIG. 6, the waveguide plate 40 includes: the light entering surface b1, the light emitting surface b2 and a back surface b3, the light emitting surface b2 is opposite to the back surface b3, the light entering surface b1 is located at the same end of the light emitting surface b2 and the back surface b3 and connected with the light emitting surface b2 and the back surface b3, and the light entering surface b1 is inclined relative to the light emitting surface b2.

A light beam emitted by the display has a certain divergence angle after being imaged through the imaging lens, and in order to make the imaging light beam, after being transmitted or reflected, totally enter the waveguide plate 40 to meet an angle requirement of delivering in the waveguide plate 40, the light entering surface b1 of the waveguide plate 40 needs to be inclined relative to the light emitting surface b2. An included angle between the light entering surface b1 and the light emitting surface b2 may be set to 40° to 60°, for example, the included angle between the light entering surface b1 and the light emitting surface b2 may be set to 50°, which is not limited herein.

As shown in FIG. 1 to FIG. 2 and FIG. 6, the light extraction component 400 includes transflective layers 401, 402, . . . , 406, the transflective layers are located between the light emitting surface b2 and the back surface b3, a set included angle is formed between the transflective layer and the light emitting surface b2, and the transflective layers are configured to partially transmit the imaging light beam and partially reflect the imaging light beam toward the light emitting surface.

The included angle between the transflective layers and the light emitting surface b2 of the waveguide plate is set to be relevant to the included angle between the light entering surface b1 and the light emitting surface b2 of the waveguide plate, the included angle between the light entering surface b1 and the light emitting surface b2 of the waveguide plate is set to be twice the included angle between the transflective layers and the light emitting surface b2, the light beam may be made to enter the transflective layers at a relatively perpendicular angle, and a reflected light beam of the transflective layers may perpendicularly enter the light emitting surface b2 of the waveguide plate.

In the embodiment of the present disclosure, the light extraction component 400 may include a plurality of transflective layers 401, 402, . . . , 406, all the transflective layers 401, 402, . . . , 406 are distributed in parallel and at equal intervals, and the transflective layers 401, 402, . . . , 406 are inclined relative to the light emitting surface b2.

When the imaging light beam enters the first transflective layer 401, part of the light beam is transmitted so as to continue being delivered to the next transflective layer 402 along the waveguide plate 40, and the other part of the light beam is reflected by the transflective layer 401. All the transflective layers in the waveguide plate 40 have the same effect, and it continues to be repeated like this. The outgoing light beam may have a certain width, and pupil expansion of the first image and the second image is realized.

The larger the quantity of the transflective layers is, the larger a light beam pupil expansion range is, the proper quantity of transflective layers may be arranged according to a length of the waveguide plate 40 and a human eye viewing range so as to adapt to application scenes of wearing the near-eye display apparatus by different people. During actual application, a range of a total length of the waveguide plate 40 is 10 cm to 20 cm, which covers pupil distances of different people, correspondingly, the quantity of the transflective layers may be 2 to 6, and the specific quantity is not limited herein.

A reflectivity of the transflective layers is increased with increasing of a distance between the transflective layers and the light entering surface b1. Merely part of the imaging light beam passing through the transflective layers is transmitted and then continues being delivered to the next transflective layer along the waveguide plate 40, and the other part of the light beam is reflected onto the light emitting surface b2. In order to guarantee that light beams reflected into the human eye by all the transflective layers are uniformly distributed, the reflectivity of the transflective layers should be increased with increasing of the distance between the transflective layers and the light entering surface b1, so that intensities of the reflected light beams emitted toward the light emitting surface b2 are uniformly distributed.

A material of the waveguide plate 40 is glass or plastic, a refractive index is about 1.5, the refractive index of the waveguide plate 40 is greater than a refractive index of air, when the imaging light beam is delivered in the waveguide plate 40, a condition of delivering the light beam toward an optically thinner medium from an optically denser medium is formed, so that the imaging light beam can be completely reflected in the waveguide plate 40, and delivering of the imaging light beam in the waveguide plate 40 is facilitated.

The near-eye display apparatus provided by the embodiment of the present disclosure includes: the first display, configured to display the first image, entering the beam splitter through the first imaging lens; the second display, configured to display the second image, entering the beam splitter through the second imaging lens, the beam splitter being configured to transmit the imaging light beam of the first imaging lens and reflect the imaging light beam of the second imaging lens; and the waveguide plate, located on the light emitting path of the beam splitter, configured to receive the outgoing light beam of the beam splitter and deliver same, wherein the light extraction component is arranged in the waveguide plate and configured to reflect the imaging light beam delivered in the waveguide plate toward a position where a human eye is located. The image distance of the first imaging lens is different from the image distance of the second imaging lens, so the first image and the second image can be displayed on two image planes, by means of adjustment of the human eye, when observing an image of an image plane, the image of the other image plane is blurry, which is consistent with a sensation of viewing an actual scene, thus eliminating the vergence-accommodation conflict.

Figure 7:
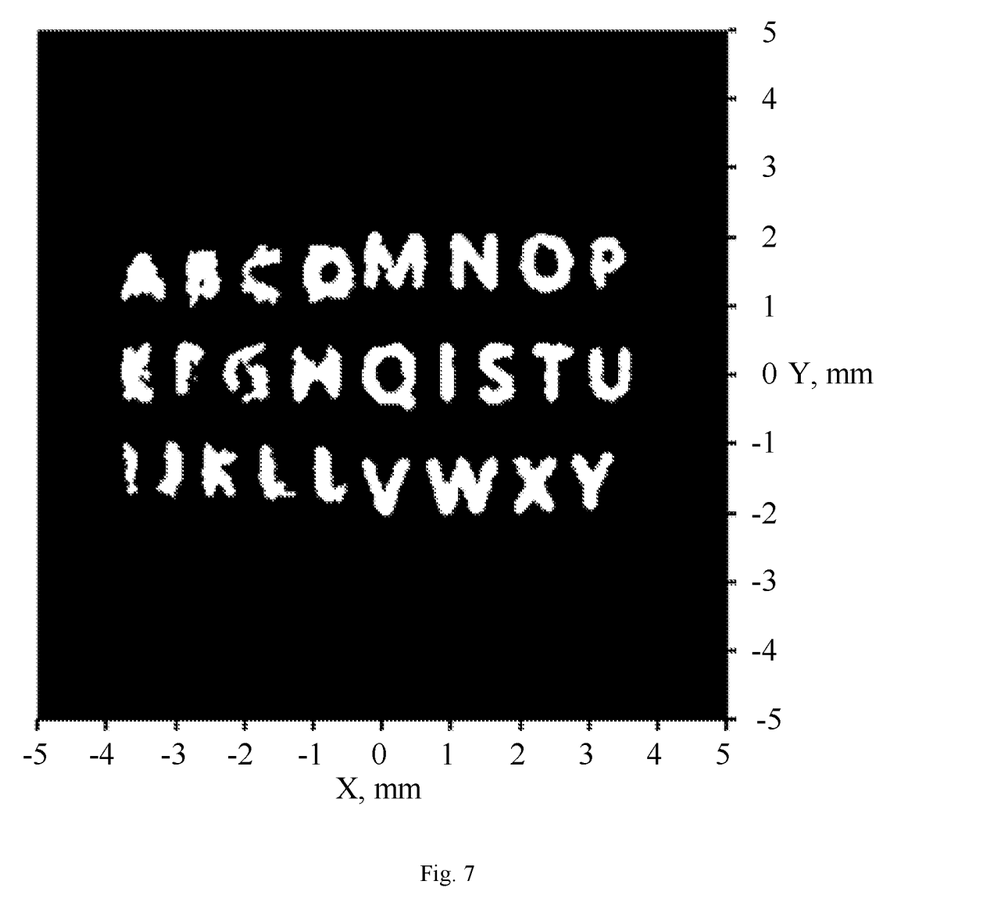
FIG. 7 is a schematic diagram of image plane simulation of a near-eye display apparatus provided by an embodiment of the present disclosure.

FIG. 7 is a schematic diagram of image plane simulation provided by an embodiment of the present disclosure. The image plane is located in a plane shown in x-y with a unit being millimeter. In FIG. 7, images in three rows of ABCD, EFGH and IJKLL are imaged on the farther image plane, and images in three rows of MNOP, QISTU and VWXY are imaged on the closer image plane.

When a receiver is arranged on the closer image plane, the images ABCD, EFGH and IJKLL imaged on the farther image plane are small in size and are blurry when viewed in a closer position. The images MNOP, QISTU and VWXY imaged on the closer image plane are large in size and clear when imaged. It is in line with the situation of viewing the real scene with the human eye. Clearly, the vergence-accommodation conflict can be eliminated by adopting the near-eye display apparatus of the above structure provided by the embodiment of the present disclosure.

Though the preferred embodiments of the present disclosure are already described, those skilled in the art can make extra changes and modifications to these embodiments once they know the basic inventive concept. Thus, the appended claims intend to be constructed as including the preferred embodiments and all the changes and modifications falling within the scope of the present disclosure.

Apparently, those skilled in the art can make various changes and variations to the present disclosure without departing from the spirit and scope of the present disclosure. In this case, if these changes and variations of the present disclosure fall within the scope of claims of the present disclosure and their equivalents, the present disclosure also intends to contain these changes and variations.

What is claimed is:

1. A near-eye display apparatus, comprising:
   a first display, configured to display a first image;
   a second display, configured to display a second image;
   a first imaging lens, located on a light emitting side of the first display and configured to perform imaging on the first image; and
   a second imaging lens, located on a light emitting side of the second display and configured to perform imaging on the second image, wherein
   an image distance of the first imaging lens is different from an image distance of the second imaging lens;
   a beam splitter, located on a side of the first imaging lens facing away from the first display and on a side of the second imaging lens facing away from the second display, and configured to transmit an imaging light beam of the first imaging lens and reflecting an imaging light beam of the second imaging lens; and
   a waveguide plate, located on a light emitting path of the beam splitter and configured to receive the imaging light beam of the first imaging lens and the imaging light beam of the second imaging lens from the beam splitter and transmit the imaging light beam of the first imaging lens and the imaging light beam of the second imaging lens, wherein a light extraction component is arranged in the waveguide plate and configured to reflect the imaging light beam of the first imaging lens and the imaging light beam of the second imaging lens that are transmitted in the waveguide plate toward a position where a human eye is located;
   wherein the waveguide plate comprises: a light entering surface, a light emitting surface and a back surface, wherein the light emitting surface is opposite to the back surface, the light entering surface is located at a same end of the light emitting surface and the back surface and connected with the light emitting surface and the back surface, and the light entering surface is inclined relative to the light emitting surface;
   wherein the light extraction component comprises a transflective layer, the transflective layer is located between the light emitting surface and the back surface, and a set included angle is formed between the transflective layer and the light emitting surface, and the transflective layer is configured to partially transmit an imaging light beam and partially reflect an imaging light beam toward the light emitting surface;
   wherein the light extraction component comprises a plurality of transflective layers, and the respective transflective layers are distributed in parallel at equal intervals and are inclined relative to the light emitting surface;
   wherein an included angle between the light entering surface and the light emitting surface is twice the included angle between the transflective layer and the light emitting surface.

2. The near-eye display apparatus according to claim 1, wherein a distance between the first imaging lens and the first display and a distance between the second imaging lens and the second display are the same, and a focal length of the first imaging lens is different from a focal length of the second imaging lens; or
   a focal length of the first imaging lens and a focal length of the second imaging lens are the same, and a distance between the first imaging lens and the first display and a distance between the second imaging lens and the second display are different.

3. The near-eye display apparatus according to claim 2, wherein the distance between the first imaging lens and the first display is smaller than the focal length of the first imaging lens, and the distance between the second imaging lens and the second display is smaller than the focal length of the second imaging lens.

4. The near-eye display apparatus according to claim 1, wherein a quantity of the transflective layers is 2 to 6.

5. The near-eye display apparatus according to claim 1, wherein a reflectivity of the transflective layer is increased with increasing of a distance between the transflective layer and the light entering surface.

6. The near-eye display apparatus according to claim 1, wherein a material of the waveguide plate is glass or plastic.

7. The near-eye display apparatus according to claim 1, wherein the beam splitter comprises: a first prism and a second prism being the same in structure; the first prism and the second prism each comprise a slope, and the slope of the first prism overlaps with the slope of the second prism so that the first prism and the second prism constitute a cuboid structure; a beam splitting layer is arranged on an overlapping surface of the first prism and the second prism;
   the second prism is arranged close to the light entering surface of the waveguide plate, and the first prism is located on a side of the second prism facing away from the waveguide plate; the first prism is arranged close to the first imaging lens, and the second prism is arranged facing the second imaging lens; and a surface of the second prism facing the light entering surface of the waveguide plate is a light emitting surface of the beam splitter, and a surface of the first prism facing the first imaging lens is a light entering surface of the first prism, and a surface of the second prism facing the second imaging lens is a light entering surface of the second prism.

8. The near-eye display apparatus according to claim 7, wherein the beam splitting layer is a semi-transmitting and semi-reflecting layer or a polarizing beamsplitting dielectric layer.

9. The near-eye display apparatus according to claim 7, wherein a surface of the first imaging lens close to the first prism is in contact with the light entering surface of the first prism through a vertex of an optical axis; and a surface of the second imaging lens close to the second prism is in contact with the light entering surface of the second prism through a vertex of an optical axis.

10. The near-eye display apparatus according to claim 7, wherein the light emitting surface of the beam splitter is attached to the light entering surface of the waveguide plate.

11. The near-eye display apparatus according to claim 1, wherein the first imaging lens comprises at least one lens; and the second imaging lens comprises at least one lens.

12. The near-eye display apparatus according to claim 11, wherein the lens in the first imaging lens adopts one of a spherical lens, an aspheric lens or a freeform lens; and the lens in the second imaging lens adopts one of a spherical lens, an aspheric lens or a freeform lens.

13. The near-eye display apparatus according to claim 12, wherein a material of the lens in the first imaging lens adopts glass or plastic; and a material of the lens in the second imaging lens adopts glass or plastic.

14. The near-eye display apparatus according to claim 1, wherein the first display and the second display adopts one of a liquid crystal display, an organic light emitting diode display, a micro-organic light emitting diode display, a liquid crystal on silicon display, a light emitting diode display, a micro-light emitting diode display or a digital light processing display.

* * * * *